US006945152B2

(12) United States Patent
Jabbari et al.

(10) Patent No.: US 6,945,152 B2
(45) Date of Patent: Sep. 20, 2005

(54) AUTOMATED BLIND CUTTING MACHINE

(76) Inventors: Abbas Jabbari, 2001 Holcombe Blvd. Apt., 3106, Houston, TX (US) 77030; Ali A. Kashani, 8606 Pastureview La., Houston, TX (US) 77024

( * ) Notice: Subject to any disclaimer, the term of this patent is extended or adjusted under 35 U.S.C. 154(b) by 144 days.

(21) Appl. No.: 10/356,734

(22) Filed: Jan. 31, 2003

(65) Prior Publication Data

US 2004/0149104 A1 Aug. 5, 2004

Related U.S. Application Data

(63) Continuation-in-part of application No. 09/919,607, filed on Jul. 31, 2001, now abandoned.

(51) Int. Cl.[7] ............................ B23D 23/00; B26D 7/00

(52) U.S. Cl. ....................... 83/468.7; 83/639.1; 29/24.5

(58) Field of Search ....................... 83/622, 636, 639.1, 83/467.1, 468, 468.1, 468.2, 468.5, 468.6, 468.7, 197, 198, 200; 29/24.5

(56) References Cited

U.S. PATENT DOCUMENTS

| | | | | | |
|---|---|---|---|---|---|
| 3,738,504 | A | * | 6/1973 | Vail et al. | 83/468.7 |
| 3,841,462 | A | * | 10/1974 | Schmidt | 198/345.1 |
| 3,854,360 | A | * | 12/1974 | Reed | 83/468 |
| 4,819,530 | A | * | 4/1989 | Huang | 83/39 |
| 5,816,126 | A | * | 10/1998 | Pluber | 83/167 |
| 5,927,172 | A | * | 7/1999 | Wang | 83/468.7 |
| 6,079,306 | A | * | 6/2000 | Liu | 83/468 |
| 6,240,824 | B1 | * | 6/2001 | Hsu | 83/622 |
| 6,604,443 | B2 | * | 8/2003 | Roberts et al. | 83/13 |
| 6,615,698 | B2 | * | 9/2003 | Chuang et al. | 83/468.4 |

* cited by examiner

*Primary Examiner*—Stephen Choi

(57) ABSTRACT

The present invention is a method and apparatus for automatically cutting a blind. The blind cutting apparatus comprises a framework, a die assembly, a cutting assembly, a clamp assembly, a blind support base, an integral measuring assembly, an electrical control assembly, and a displacement mechanism. The blind is cut to the exact dimensions by the operator who inputs the dimensions of the window and the size of the blind.

1 Claim, 4 Drawing Sheets

AUTOMATED BLIND CUTTING MACHINE

CROSS-REFERENCE TO RELATED APPLICATIONS

This application is a continuation-in-part of and claims priority to U.S. patent application Ser. No. 09/919,607, filed on Jul. 31, 2001, now abandoned.

STATEMENT REGARDING FEDERALLY SPONSORED RESEARCH

Not applicable.

BACKGROUND OF THE INVENTION

1. Field of the Invention

The present invention relates generally to an automated blind cutting machine, used for cutting manufactured horizontal and vertical blinds to the desired size by those of all skill levels, and a method of operation thereof.

2. Description of the Related Art

A horizontal blind is a popular window covering, comprising a head rail, a foot rail, and a plurality of slats suspended horizontally from the head rail. The slats are supported by at least two parallel ladder tapes or straps which are usually suspended from the head rail and extend down to the foot rail. A vertical blind is another popular window covering, comprising a head rail and a plurality of slats suspended vertically from the head rail. Both types of blinds may be manufactured in a variety of sizes. Because many windows are of standard dimensions, manufacturers prefer to produce their products in these standard sizes. However, customers often require blinds for windows of non-standard sizes and therefore are forced to order custom blinds. Ordering custom blinds from a factory or distributor is relatively expensive and not economical for the average customer.

Therefore, a customer requiring custom blinds will typically purchase the blind from a retailer who prepares a custom-sized blind according to measurements provided by the customer. Such retailers frequently use a power miter saw to individually cut down the components of the blind which are then assembled at the retailer's facility. Some retailers cut down pre-assembled blinds, but they use a power miter saw which cuts rapidly through the pre-assembled blind with little resistance. Both the head rail and the foot rail are designed to have cross sections of fixed specifications. However, they are so different in their cross-sectional shapes that they are usually cut with separate and different cutting apparatus, thus resulting in a waste of resources. Also, the slats of the blind are made of relatively thin and soft material so the whole blind must be processed and cut with great care to avoid damaging the slats. Additionally, for horizontal blinds, the thin and soft ladder tapes are often damaged during cutting and other fabricating processes.

Furthermore, the problem of cutting custom made blinds in a retail establishment may be further complicated by the level of skill of the retail employee who is responsible for cutting the blind. Retail establishments often have difficultly retaining skilled personnel. Thus, there can be a variation in the quality of the customizing or cutting, depending on the skill of the employee operating the machine.

The window covering market is very competitive. As such, the market is price sensitive and the consumer may ultimately choose an alternative window covering if required to pay exorbitant amounts for customizing services. Customizing also requires extra time. In the past, in order to meet consumers' needs, different cutting machines have been used at distribution stations. Many of these cutting machines have major disadvantages. Many are complicated in structure and are composed of numerous parts. Additionally, many of these cutting machines are very large, taking up as much as 40 linear feet of space. Some more recently developed cutting machines are described below.

U.S. Pat. No. 5,927,172 to Wang describes a cutting machine including a worktable on which a cylinder, multiple dies, a limiting mechanism and a cutting tool are arranged. The cutting tool is connected to an output end of the cylinder and is formed of multiple blades. A die holder is fixed onto the worktable to hold selected dies which are formed of sliding channels into which the cutting tool extends to slidably move.

U.S. Pat. No. 5,816,126 to Pluber describes a cutter for shortening blinds. The cutter comprises a framework, a stationary matrix being fixed with respect to the framework and having a first opening for receiving the top rail of the blinds, at least one second opening for receiving the slats and a third opening for receiving the foot rail. A support member, that is slidable with respect to the matrix, comprises a displacement mechanism for displacing the support member with respect to the matrix in a direction perpendicular to longitudinal axises of the openings.

U.S. Pat. No. 5,799,557 to Wang describes a blind cutting machine comprising a support framework, a cutter module replaceably mounted on top of the support framework, two air cylinders for driving the cutter mounted in the cutter module, two sets of quick couplings for connecting the air cylinders to an upper cutter, a strip cutter, and a lower cutter mounted in a cutter seat of the cutter module, a blind supported pivotally connected to the support framework in front of the cutter module for stably supporting the blind to be cut, and a blind locating assembly fixedly mounted behind the cutter module for adjustably deciding the length of the blind to extend into the cutter module. With the air cylinders being connected to the cutters, the cutters are driven to cut the rails and slats of the blind with only one cut.

U.S. Pat. No. 5,339,716 to Sands et al. describes a cutter comprising a framework which has a receiving area for receiving the blind. A cutter blade is attached to a slide bar which is slidably mounted in the framework. The slide bar includes a rack engaged with a pinion gear that is rotated by a ratchet handle. Movement of the ratchet handle slides the slide bar along the framework and forces the cutter blade through the blind. This cutter requires a long stroke of the operating handle and the same blade cuts through different materials. Thus, the blade is usually badly worn after each cut and requires attending. Also, no means are provided for preventing deformation of the blind during cutting. Furthermore, a pump with long stroke is required, thus resulting in increased cost.

Therefore, there remains a need for a blind cutting machine that is economical, automated, and easy to use by those of all skill levels and that performs well. It is an object of the present invention to provide an improved cutting machine.

SUMMARY OF THE INVENTION

According to the present invention, an automated blind cutting machine is provided that comprises a framework 10, an electrical control assembly 20, an integral measuring assembly 30, a clamp assembly 40, a die assembly 50, a cutting assembly 60, a blind support base 70, and a displacement mechanism 80. The preferred invention is designed to operate by loading the blinds vertically rather than horizontally so as to reduce the amount of space needed to house the device. Furthermore, the present invention is designed to cut both vertical and horizontal blinds by having multiple dies to accommodate the various shapes of the head rails, foot rails (if applicable), and slats.

In the preferred embodiment, the framework 10 supports the blind and the various components of the machine. The die assembly 50 is a generally flat plate that comprises one or more dies configured to receive the head rail, the foot rail (if applicable), and the slats. Preferably, a guide is provided on the die assembly 50 to facilitate inserting the blind components into the die. One type of guide is simply a funneling guide wherein the opening at the top of the die is larger than the opening at the bottom of the die, i.e., tapered. A clamp assembly 40 is positioned above the die to stabilize and support the bulk of the blind during the cutting step. The blind support base 70 is a movable plate (preferably by hydraulic action) located below the die, and it operates to position the end of the blind at a predetermined distance from the cutting assembly 60 so that the cutting assembly 60 will cut off the desired length of the blind. The cutting assembly 60 comprises an essentially flat surface and multiple blades, and it is mounted flush with the underside of the die. The blind support base 70 is connected to the integral measuring assembly 30 and raises or lowers the blind relative to the cutting assembly 60 to achieve the desired cut-down dimensions of the blind. The integral measuring assembly 30 calculates the proper position of the blind support base 70 according to the blind and window measurements programmed by the operator using the electrical control assembly 20 so that the blind support base 70 will automatically position the blind to the appropriate depth below the cutting assembly 60. Once the blind support base 70 is properly positioned by the using the integral measuring assembly 30, the blind is placed in die assembly 50 and clamped down. The electrical control assembly 20 comprises a key pad to receive input and the computing ability to calculate the dimensions of the cut-down blind from that input. After the blind is properly positioned for cutting, the clamp assembly 40 clamps on the blind to hold it firmly in place while the blind is being cut. The clamp assembly 40 comprises a clamping device which can be manually operated to hold the blind in place while the blind is being cut. After the blind is clamped firmly in place, the blind support base 70 moves away from the blind, preferably by means of hydraulic action. This action allows the cut portion of the blind to fall away from the rest of the blind during the cutting step. The cutting assembly 60 comprises a plate with multiple sections and multiple openings preferably positioned immediately below the die assembly 50. The displacement mechanism 80 is connected to the cutting assembly 60 and moves the cutting assembly 60 horizontally, preferably by hydraulic action. This movement is in one direction perpendicular to the portion of the blind extending below the die and can best be described as a guillotine action. Preferably, after the blind is cut, the blind support base 70 moves back into place immediately under the cut blind, the clamp is released, and the blind is removed from the device. In the case of horizontal blinds, the procedure is repeated on the opposite end of the blind to make the blind uniform relative to the slat ladders.

It is an object and feature of this invention to provide a blind cutting apparatus that is automated and easy to use by one of little skill.

It is another object of this invention to provide a blind cutting apparatus that has a simple structure and can be used to cut the slats and the rails of horizontal and vertical blinds to a desired length by only one cut to produce uniform cut edges on the rails and the slats.

A further object of this invention is to provide a blind cutting machine that is so designed that the cutter module thereof can be easily and quickly replaced with other cutter modules which will cut a variety of blinds.

Another object and feature of this invention is to provide a blind cutting machine that allows for the easy replacement of components thus resulting in increased productivity and efficiency.

Yet another object of the present invention is to provide a blind cutting machine for cutting slats and rails on ether end so that readjustment of mounting mechanisms or ladders is not required when sizing the blind.

These and other objects, advantages and features of this invention will be apparent to those skilled in the art from a consideration of this specification including the attached drawings and appended claims.

DETAILED DESCRIPTION OF INVENTION

Figure 1:
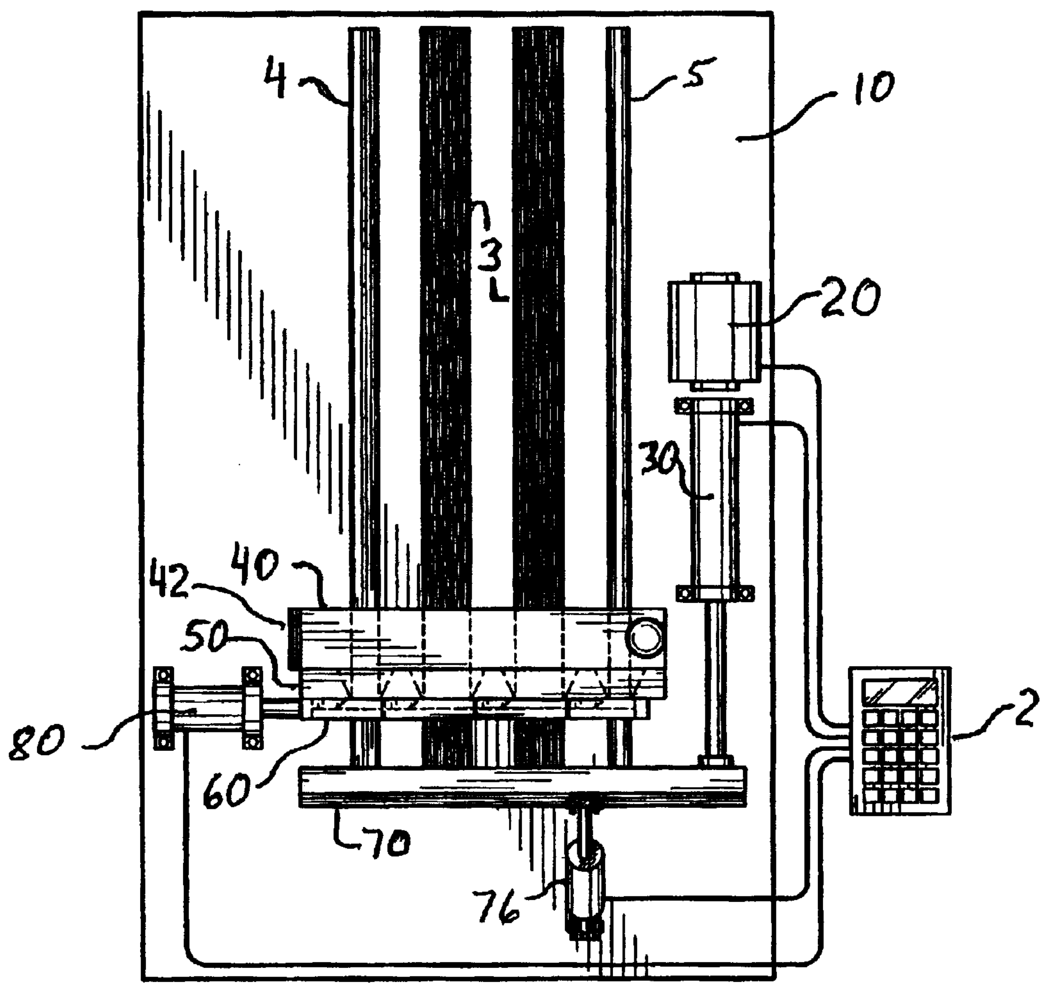
FIG. 1 is a front view of the invention with blinds inserted for cutting.
Figure 2:
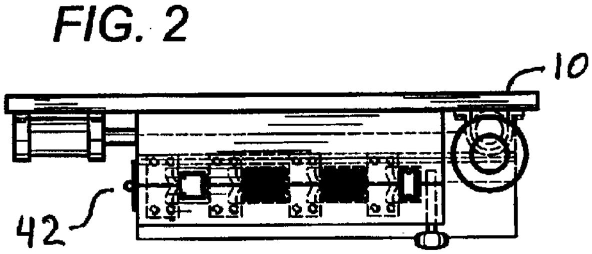
FIG. 2 is a top view of the invention with blinds inserted for cutting.
Figure 3:
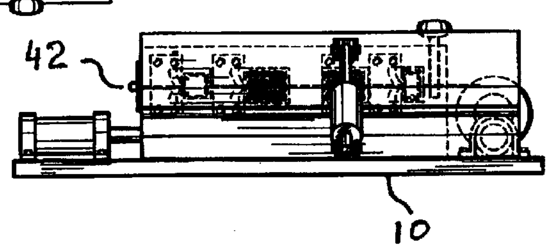
FIG. 3 is a bottom view of the invention.
Figure 4:
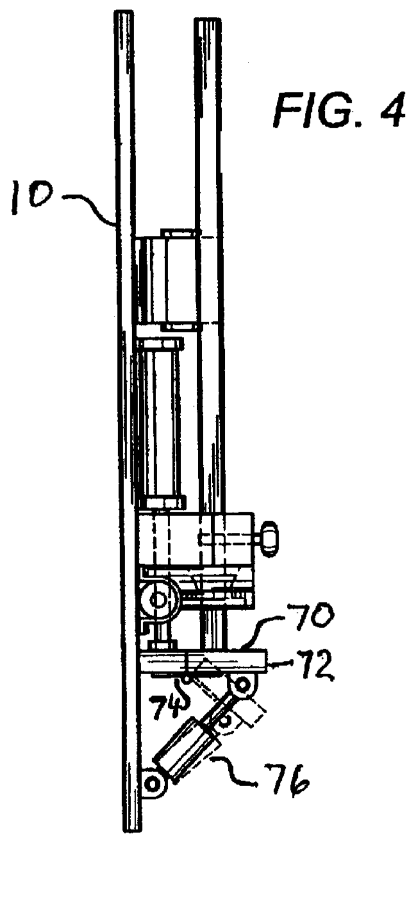
FIG. 4 is a left side view of the invention.
Figure 5:
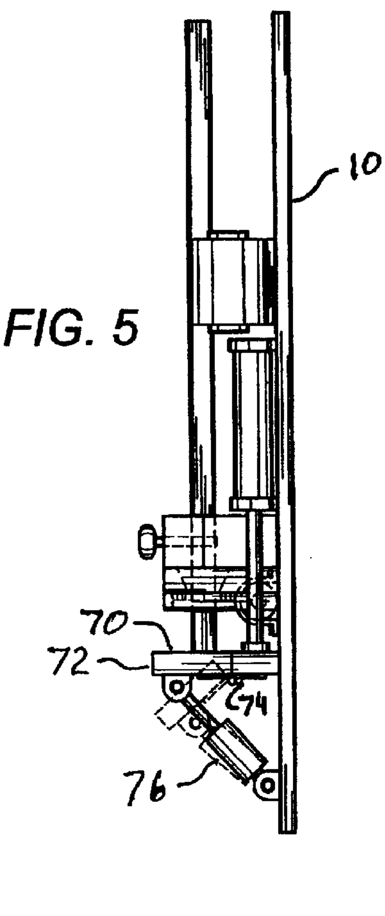
FIG. 5 is a right side view of the invention.
Figure 6:
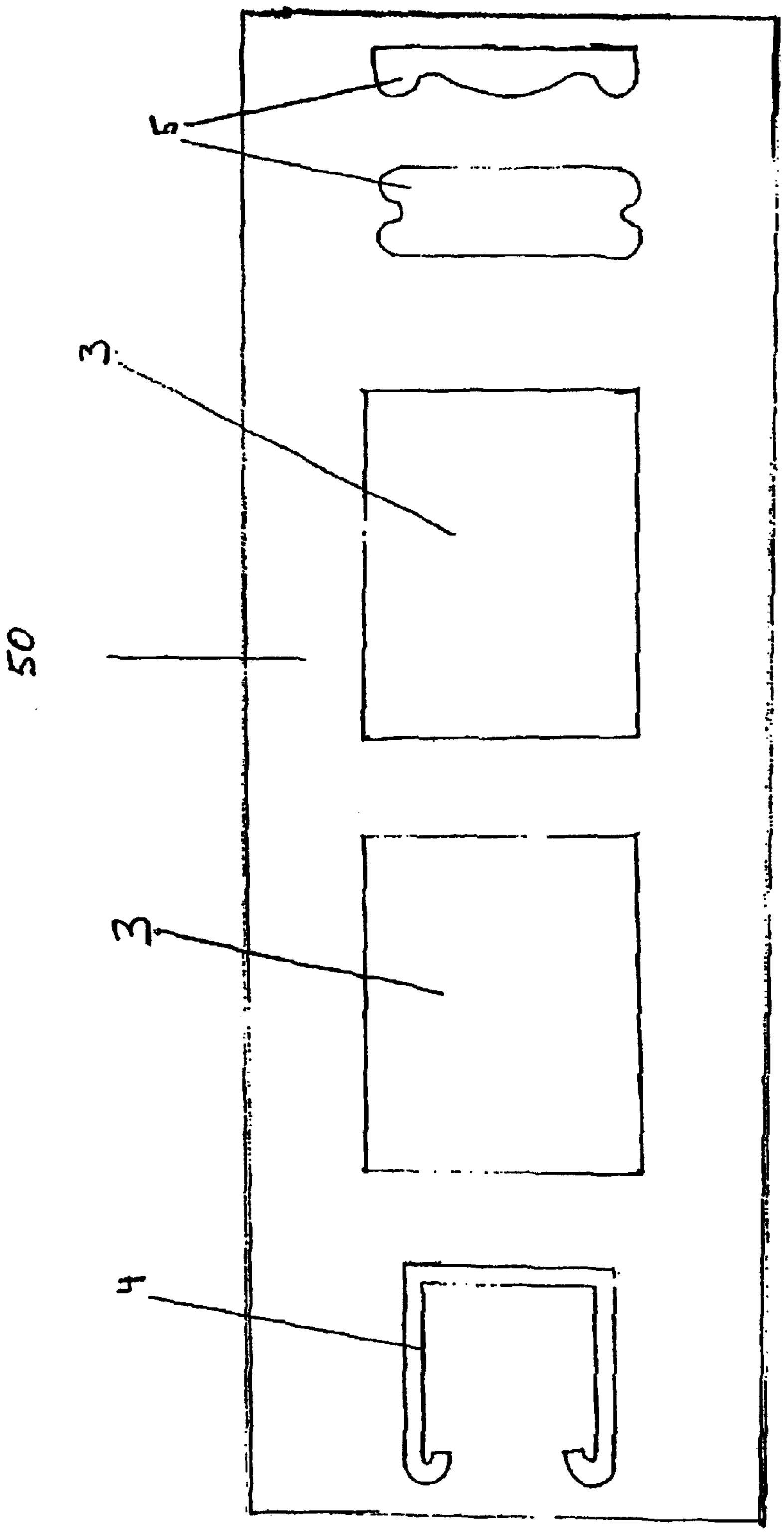
FIG. 6 is a top view of the die assembly.

The present invention is an apparatus for cutting a horizontal or vertical blind comprising a head rail 4, a foot rail 5 (if applicable) and a plurality of slats 3. The blind cutting apparatus is preferably designed for vertical insertion of the blind into the blind cutting machine before cutting the blind. In this invention, all components of the blind are simultaneously inserted into the blind cutting machine. The sizing of the blind to be cut and the cutting of the blind are automated and do not require a skilled operator. The blind cutting apparatus comprises a framework 10, an electrical control assembly 20, an integral measuring assembly 30, a clamp assembly 40, a die assembly 50, a cutting assembly 60, a blind support base 70, and a displacement mechanism 80.

In the preferred embodiment, the framework 10 comprises an essentially vertically extending body for vertical loading of the head rail 4, foot rail 5 (if applicable), and slats 3. In a preferred embodiment, the framework 10 of the blind cutting machine comprises an essentially vertically extending back and a essentially horizontally extending die assembly 50 and cutting assembly 60. The framework 10 has a clamp assembly 40 for firmly holding the blind components in place during the cutting step. Preferably, the framework 10 also has a guide for ease in inserting the blind components into the die assembly 50. One such type of guide is a simple tapering of the die wherein the top of the die has a larger opening than the bottom of the die. This arrangement makes it easier to insert the blind components which are often long and unwieldy.

In the preferred embodiment, the clamp assembly 40 is mounted directly over the die assembly 50 and is generally rectangular in shape. For ease in loading the blind components, the clamp assembly 40 should be designed with a hinge 42 to allow the front portion of the clamp to open. The clamp assembly 40 can then be loosely closed around the blind components to function as a guide assembly during the positioning step. Also, the clamp assembly 40 should be designed with an inside surface that does not mar the blind components during the cutting step. A variety of surfaces will work, but rubber is preferred because of its durability and compressibility. Because the preferred embodiment is designed with multiple dies to cut different shapes of head rails 4 and foot rails 5, each die should have a clamp/guide assembly mounted directly over the die. The clamp assembly 40 can be either fixed in relation to the die assembly 50 or it can be mounted for vertical and synchronous motion with the blind support base 70. If stationary, the blind cannot be clamped down before the blind is positioned by the blind support base 70 and integral measuring assembly 30. If the clamp assembly 40 moves with the blind support base 70, the blind can be clamped before the positioning step. In the preferred embodiment, the integral measuring assembly 30 raises or lowers the blind support base 70 according to the length of blind to be cut, the blind is inserted into the die assembly 50 and clamp down to prevent movement during the cutting step. The clamp assembly 40 maintains the head rail 4, the foot rail 5 (if applicable) and slats 3 substantially perpendicular to the die assembly 50. The clamp assembly 40 preferably comprises aluminum, which is lighter and easier to manufacture than many other metals, and is preferably a machined aluminum block.

The die assembly 50 is a generally horizontal metal plate with cavities to match the profile of the head rail 4, foot rail 5 (if applicable) and slats 3. Preferably, the die for the horizontal slats 3 is divided into at least two sections because of the number of slats 3 and the distance that the cutting blade must travel if only one blade were used. By dividing the slats 3 into at least two sections, the distance that the slat blade travels is roughly equal to the distance that the head rail 4 blade must travel. In the case of vertical blinds, the die matches the profile of the head rail 4 and the die for the slats 3 can be a single opening. As previously stated, the die cavities are shaped and sized particularly corresponding to the desired shape of the blinds to be cut and for holding the head rail 4, the foot rail 5 and the plurality of slats 3 in place during cutting. Preferably, the die is tapered with a larger opening at the top to help guide the blind components into the die assembly 50. In the preferred embodiment, the die comprises hardened tool steel.

In the preferred embodiment, an electrical control assembly 20 is mounted on the framework 10 and is connected via a power cable to the displacement mechanism 80 and the integral measuring assembly 30. The electrical control assembly 20 comprises a key pad 22 having a power button and numerical keys for inputting the starting length of blind, the size of the window, and the particular mounting required (inside or outside the window frame). The electrical control assembly 20 also has the ability to calculate how much to cut off the blind from that input, and transmit that information to the integral measuring assembly 30 which raises or lowers the blind support base 70 accordingly.

Figure 7:
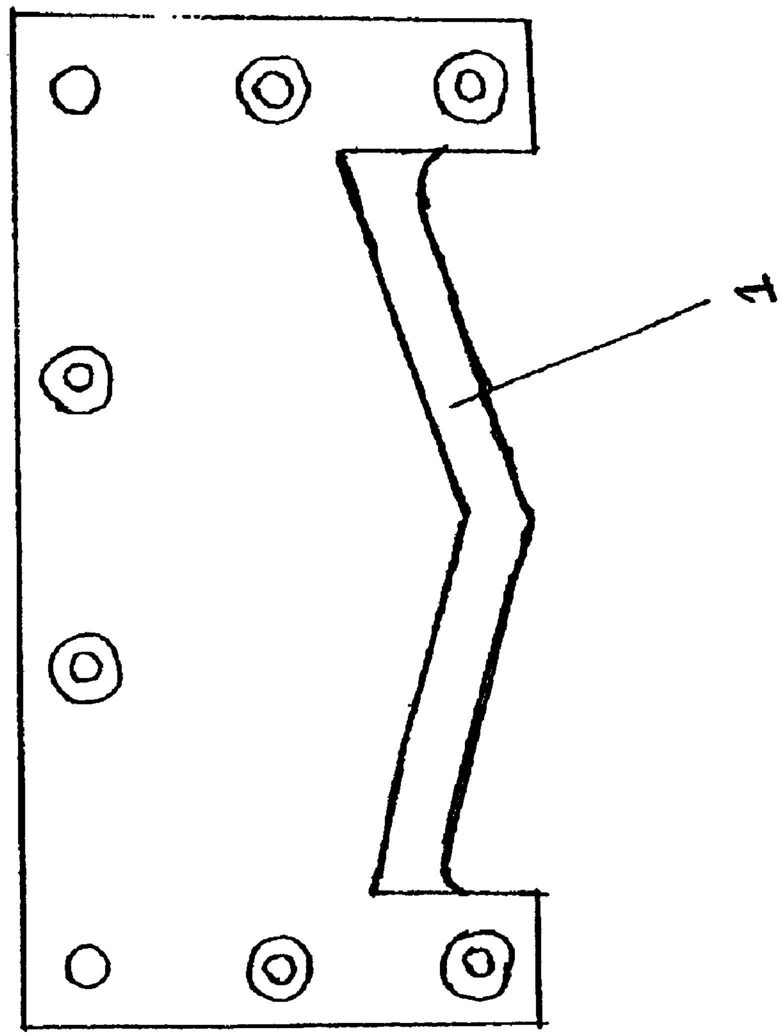
FIG. 7 is a top view of the back blade.

The cutting assembly 60 comprises an essentially flat surface and multiple blades. The flat surface has a number of openings arranged longitudinally that correspond to the die assembly 50. The cutting assembly 60 preferably has a front blade for cutting the bottom rail, at least one middle blade for cutting the slats 3 and a back blade 1 for cutting the top rail. In the most preferred embodiment, two middle blades are used. The blades are preferably essentially flush with the flat surface of the cutting assembly 60 and slide essentially flush under and along the die assembly 50. When the cutting assembly 60 is properly positioned under the die assembly 50 at the start of the process, cutting edges of the blades are hidden from view if one were to look down through the die assembly 50. As such, free and unobstructed loading of the blind onto the die assembly 50 is made possible. The blades may be removable and attachable by threaded screws to the flat surface for ease in replacement. In a preferred embodiment, all blades cut the blind simultaneously. Blades of different mechanical properties may be used for cutting the different components of the blind made of different material, thus ensuring improved surface quality of the cut blind and increased life time of the blades. Preferably, at least the back blade 1, used for cutting the top rail, has a pointed or V-shaped edge (as shown in FIG. 7), thus minimizing the cutting force and improving the face quality of the cut blind. The multiple blades are adjacent to the number of openings of the flat surface and are essentially flush with the flat surface. The cutting assembly 60 is connected to the displacement mechanism 80. A hydraulic assembly comprising a piston and a cylinder apply a horizontal force to the cutting assembly 60. The hydraulic assembly is attached via a power cable to the electrical control assembly 20. Since the multiple blades correspond to the number of openings in the die assembly 50, the cutting may be completed with a single, shortened stroke of a cylinder. The cutting assembly 60 is mounted for motion in the longitudinal direction and along the sliding channel of the die assembly 50 and perpendicularly to any blind extending through the die assembly 50. The cutting assembly 60 preferably comprises hardened tool steel.

The blind support base 70 preferably comprises a generally flat horizontal plate that is attached to the framework 10. The blind support base 70 is connected to the integral measuring assembly 30. After the operator has input the required measurements, the hydraulic assembly of the integral measuring assembly 30 moves the blind support base 70 vertically which raises or lowers the blind support base 70 relative to the cutting assembly 60. As the blind is being loaded into the blind cutting apparatus, it passes through the clamp assembly 40 and the die assembly 50 and rests on the blind support base 70. Of course, this sequence of steps could be altered by inserting the blind components before the blind support base 70 is adjusted, but that sequence is not preferred because of the potential for marring or bending the blind. Once the blind is positioned for cutting and firmly held by the clamp assembly 40, the blind support base 70 is preferably moved out of the way so the cut portions of the blind can fall to the bottom of the framework 10. The preferred method of moving the blind support base 70 out of the way is by hydraulically lowering the front edge 72 of the base 70. This motion can be easily accomplished by hinging 74 the blind support base 70 to the integral measuring assembly 30. The cut blind portion falls to the underside of the framework 10 (for example into a bin) for easy removal. In a preferred embodiment, the blind support base 70 comprises aluminum.

The displacement mechanism 80 is connected to the cutting assembly 60 and is used to move the cutting assembly 60 perpendicular to any blind extending through the die assembly 50 and the cutting assembly 60. In a preferred embodiment, the cutting assembly 60 is first moved in one direction to cut the blind and then moved in the opposite direction to its original position after the blind has been cut.

In a preferred embodiment, the displacement mechanism 80 comprises a hydraulic pump that has a hydraulic cylinder.

The hydraulic pump is electrically driven by an electric motor which is connected via a power cable to the electrical control assembly 20. In the case of the cutting assembly 60, when the hydraulic cylinder is actuated, i.e., when the power button is pushed, the cutting assembly 60 moves linearly, first in one direction, and then in an opposite direction, cutting the blind on the first pass. After the blind has been cut, the cutting assembly 60 is returned to its original position. In the case of the blind support base 70, the hydraulic cylinder 76 is directly connected by wires to the electrical control assembly 20. The hydraulic pump moves the attached blind support base 70 downwardly from the firmly held blind allowing the cut blind portion to fall away from the remainder of the blind.

In a preferred embodiment, an integral measuring assembly 30 adjusts the blind support base 70 and thereby establishes the amount to be cut off the blind. The integral measuring assembly 30 comprises a hydraulic pump that is electrically driven by an electric motor and the electric motor is connected via a power cable to the electrical control assembly 20. The electrical control assembly 20 is connected to integral measuring assembly 30 and indicates the amount of displacement of the blind support base 70 thereby displaying the amount of change in the length of the cut portion of the blind. Thus the length of the cut portion of the blind is preferably presented digitally. The hydraulic pump of the integral measuring assembly 30 comprises an electric motor and a hydraulic cylinder that is attached to the blind support base 70 such that when the operator selects the type of mounting (inside or outside the window frame), and enters the measurements of the window and the starting measurements of the selected blind, the hydraulic cylinder on the blind support base 70 is actuated and the blind support base 70 moves vertically according to the required dimensions of the blind to be cut.

Each component of the blind cutting apparatus, as well as the manner of the assembly of the components, contribute to some advantage for the present invention over the prior art. The positioning of the framework 10, the clamp assembly 40, the die assembly 50, the cutting assembly 60, the blind support base 70, the integral measuring assembly 30, and the displacement mechanism 80, individually and with respect to each other result in automatic cutting of blinds thus requiring very little skill on the part of the operator.

In addition, each component of the blind cutting apparatus contributes to the secure holding of the rails 4, 5 and slats 3 in place and prevents twisting of the rails 4, 5 and slats 3 while they are being cut, resulting in a high quality cut.

Also, the blind cutting machine is designed such that the cutting assembly 60 is moved with a very linear, uniform, consistent and stable motion along the die assembly 50.

Furthermore, the present invention provides a blind cutting machine for cutting slats 3 and rails 4, 5 on either end so that readjustment of mounting mechanisms or ladders is not required when sizing the blind.

Finally, in the present invention, each stroke of the hydraulic cylinder in the displacement mechanism 80 which powers the cutting assembly 60, equals the distance to which the cutting assembly 60 is moved forward. Thus, the stroke of the hydraulic cylinder is sufficient to cut the top rail, the foot rail 5 (if applicable) and each grouping of slats 3. Therefore, only one single hydraulic cylinder is required to control the cutting assembly 60 and to complete cutting of the top rail, the foot rail 5 (if applicable), and the plurality of slats 3 simultaneously in one stroke. Therefore, only a non-expensive short-stroke hydraulic cylinder is required for use in the present invention. As a result of needing only a single stroke to complete cutting, less time is needed to complete the cutting step.

Certain objects are set forth above and made apparent from the foregoing description, drawings and examples. However, since certain changes may be made in the above description, drawings and examples without departing from the scope of the invention, it is intended that all matters contained in foregoing description, drawings and examples shall interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention. Further, since numerous modifications and changes will readily occur to those skilled in the art, it is not desired to limit the invention to the exact construction and operation shown and described, and accordingly, all suitable modifications and equivalent may be resorted to, falling within the scope of the invention. It is also to be understood that the following claims are intended to cover all of the generic and specific features of the invention herein described, and all statements of the scope of the invention which, as a matter of language, might be said to fall in between.

We claim:

1. An apparatus for cutting a blind comprising:

a. a vertically-oriented framework configured to receive a blind for cutting;

b. a die assembly fixed to the framework and having one or more cavities shaped for holding a head rail and slats while the blind is being cut;

c. a cutting assembly having an essentially flat surface with openings to correspond to the cavities in the die assembly, and having cutting blades that are adjacent to the openings in the flat surface, such that the cutting assembly is mounted for linear movement along the die assembly;

d. a clamp assembly attached to the framework and mounted to hold the blind firmly in place during cutting;

e. a blind support base having a top surface to contact one edge of the blind, and mounted for movement in the direction of the long axis of the blind;

f. a displacement mechanism having contact with the cutting assembly and having a hydraulic assembly that is connected to the cutting assembly so as to move to the blade of the cutting assembly in a direction perpendicular to the long axis of the blind;

g. an integral measuring assembly having a hydraulic assembly connected to the blind support base whereby the blind support base moves vertically to a predetermined position dependent on the amount of blind to be cut off;

h. an electrical control assembly operably connected to the displacement mechanism and the integral measuring assembly wherein the electrical control assembly is capable of receiving input from an operator and calculating the dimensions of the cut-down blind from that input.

* * * * *